US009186637B2

(12) United States Patent
Rigel

(10) Patent No.: US 9,186,637 B2
(45) Date of Patent: Nov. 17, 2015

(54) MIXING TUMBLER

(76) Inventor: Doron Rigel, Tel Aviv (IL)

(*) Notice: Subject to any disclaimer, the term of this patent is extended or adjusted under 35 U.S.C. 154(b) by 0 days.

(21) Appl. No.: 13/456,370

(22) Filed: Apr. 26, 2012

(65) Prior Publication Data

US 2012/0275258 A1     Nov. 1, 2012

(30) Foreign Application Priority Data

Apr. 27, 2011    (IL) .......................................... 212512

(51) Int. Cl.
| A47J 43/27 | (2006.01) |
| B01F 13/00 | (2006.01) |
| B01F 11/00 | (2006.01) |
| B01F 15/00 | (2006.01) |
| B01F 15/02 | (2006.01) |

(52) U.S. Cl.
CPC ............. *B01F 13/0022* (2013.01); *A47J 43/27* (2013.01); *B01F 11/0011* (2013.01); *B01F 15/00512* (2013.01); *B01F 15/0215* (2013.01)

(58) Field of Classification Search
CPC .. A47J 43/27; B01F 11/0011; B01F 15/0215; B01F 15/00512; B01F 13/0022
USPC ............. 366/130; 206/219–222; 215/DIG. 8; 220/568
See application file for complete search history.

(56) References Cited

U.S. PATENT DOCUMENTS

| 2,533,806 | A | * | 12/1950 | Holzapfel | ..................... 206/221 |
| 2,764,157 | A | * | 9/1956 | Fernandez et al. | ............ 206/221 |
| 2,807,384 | A | * | 9/1957 | Lipari | .......................... 215/11.1 |
| 2,813,649 | A | * | 11/1957 | Lipari | .......................... 215/11.1 |
| 3,221,917 | A | * | 12/1965 | De Santo et al. | ............. 220/502 |
| 3,321,097 | A | * | 5/1967 | Solowey | ....................... 206/221 |
| 3,349,966 | A | * | 10/1967 | Schwartzman | .................. 222/80 |
| 3,477,431 | A | * | 11/1969 | Walecka | .......................... 604/89 |
| 3,521,745 | A | * | 7/1970 | Schwartzman | ............... 206/222 |
| 3,539,794 | A | * | 11/1970 | Kennerly et al. | ............... 362/34 |
| 5,634,714 | A | * | 6/1997 | Guild | ............................. 366/130 |
| 5,863,126 | A | * | 1/1999 | Guild | ............................. 366/130 |
| 6,021,892 | A | * | 2/2000 | Baudin | ......................... 206/221 |
| 6,068,396 | A | * | 5/2000 | Baudin | ......................... 366/130 |
| 6,257,428 | B1 | * | 7/2001 | Caola | .......................... 215/11.1 |
| 7,810,661 | B2 | * | 10/2010 | Murphy | ....................... 215/11.1 |
| 7,866,465 | B2 | * | 1/2011 | Dverin | ......................... 206/219 |
| 8,413,803 | B2 | * | 4/2013 | Questad et al. | ................ 206/221 |
| 8,646,966 | B2 | * | 2/2014 | Marino et al. | ................. 366/130 |
| 8,807,362 | B2 | * | 8/2014 | Lee et al. | ....................... 215/316 |
| 2013/0037427 | A1 | * | 2/2013 | Wu | ................................ 206/222 |
| 2014/0102918 | A1 | * | 4/2014 | Eitrheim et al. | .............. 206/219 |
| 2015/0090617 | A1 | * | 4/2015 | Reza | ............................ 206/221 |

* cited by examiner

Primary Examiner — Charles Cooley

(57) ABSTRACT

A mixing tumbler with two or more compartments, each designed to contain a different component used to prepare a desired mixture, which is structured so as to enable the user to initiate the collapse of the partitions between the compartments, enabling the components to mix and create the desired mixture. The mixing tumbler comprises a flask that is divided into two or more compartments, a cover, and separation discs between the said compartments.

3 Claims, 6 Drawing Sheets

MIXING TUMBLER

TECHNICAL FIELD

Figure 1:
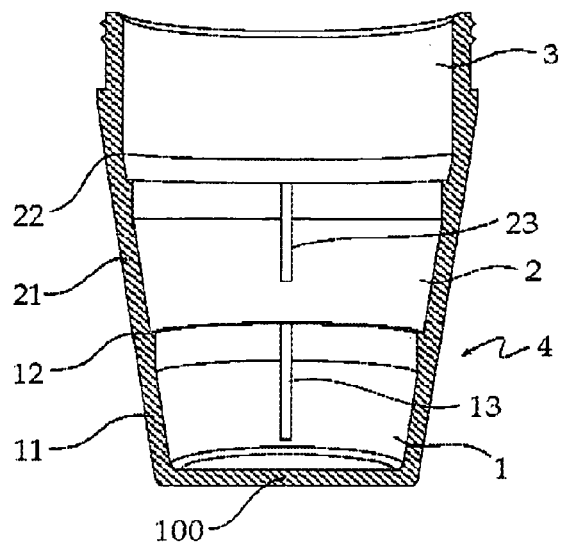
Figure 2:
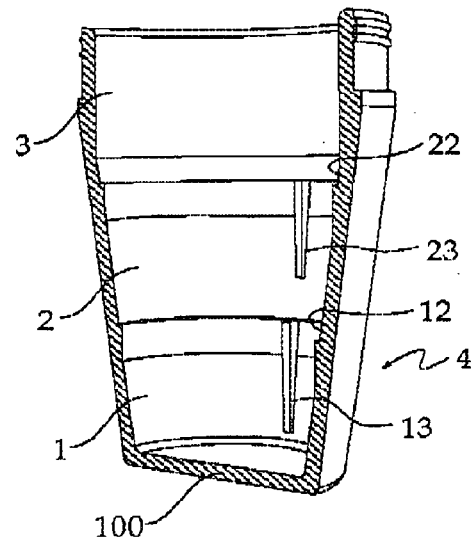
Figure 3:
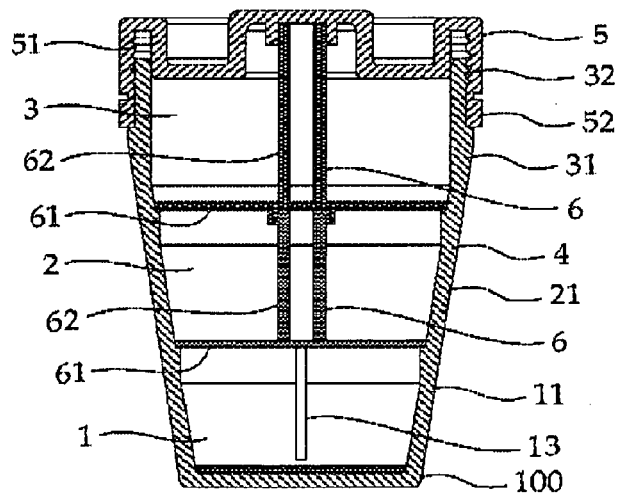
Figure 4:
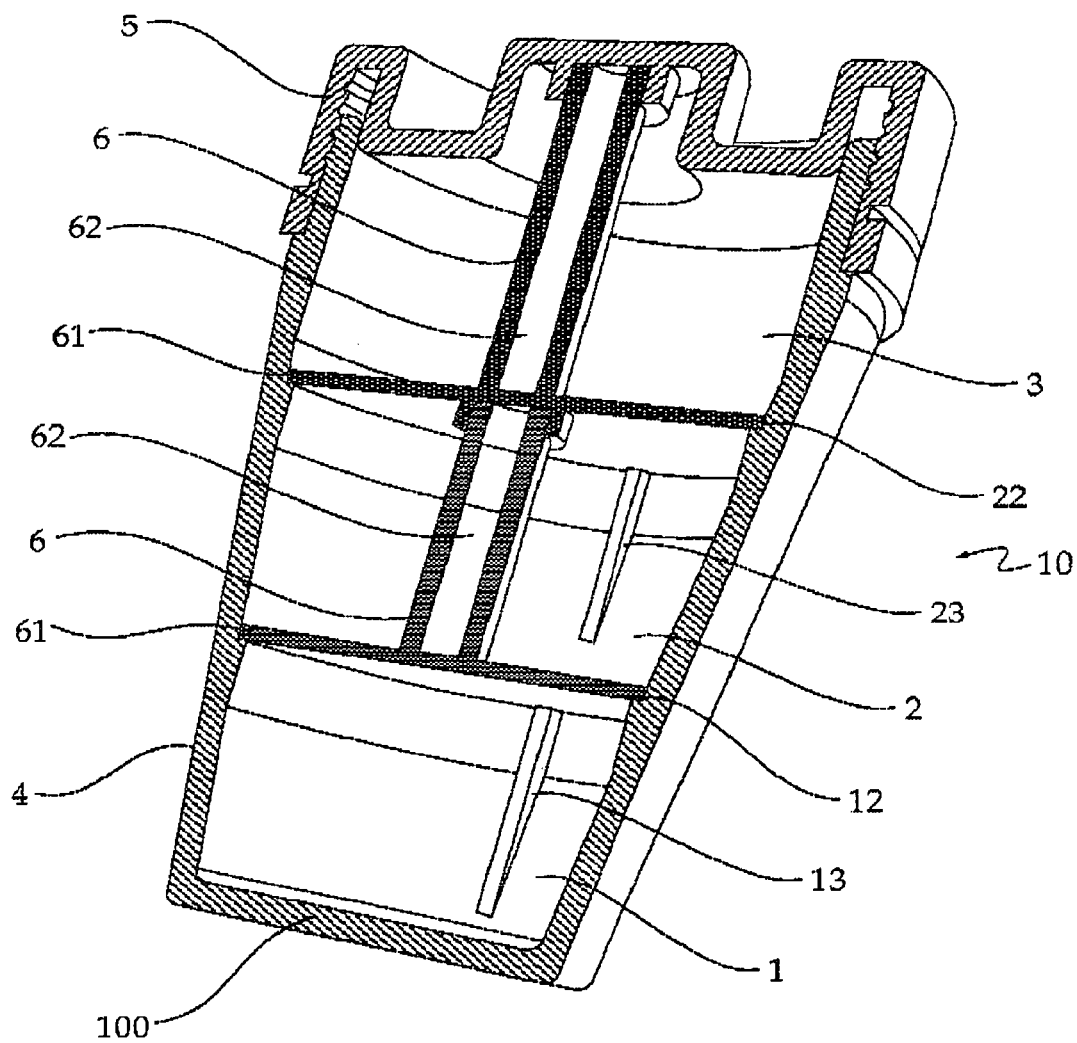
Figure 5:
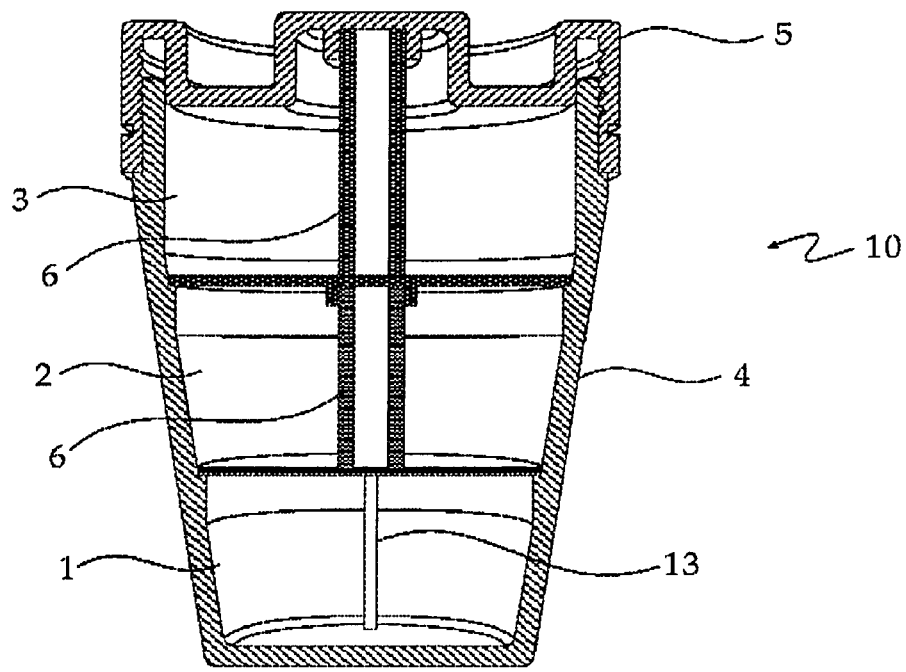
Figure 6:
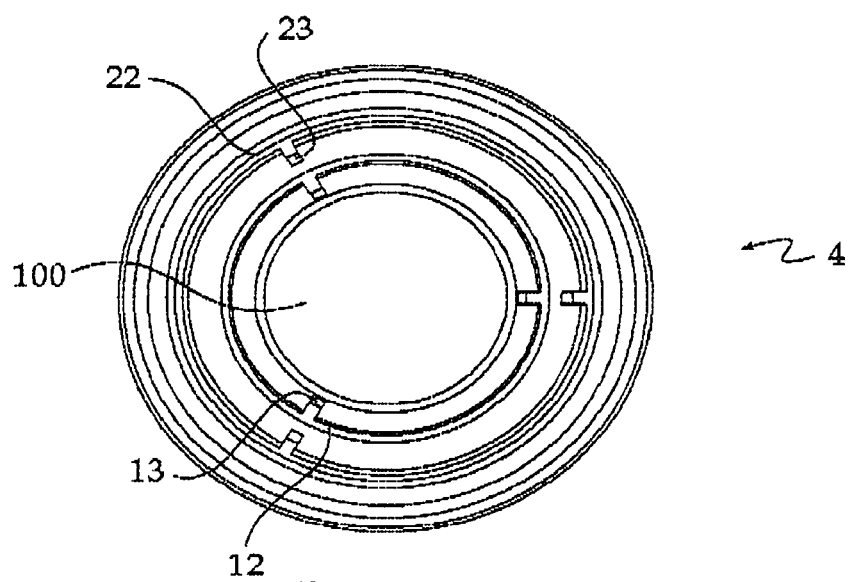
Figure 7:
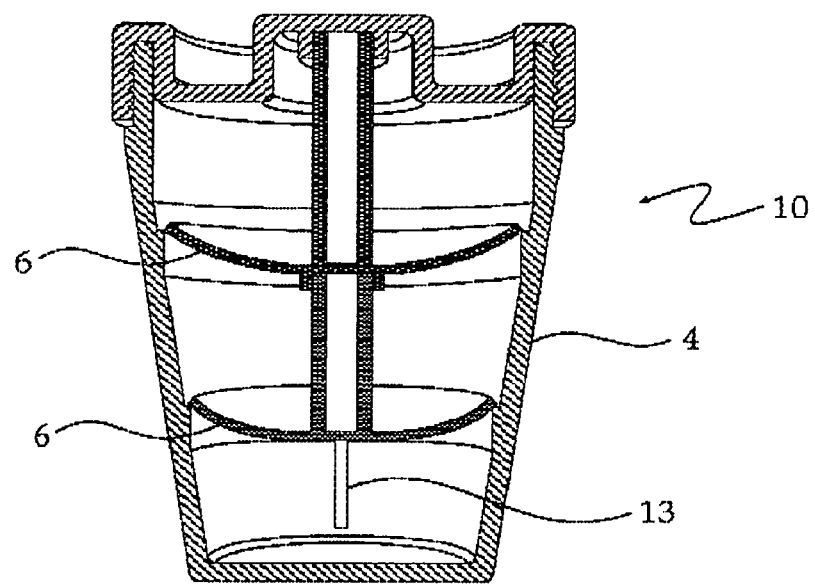
Figure 8:
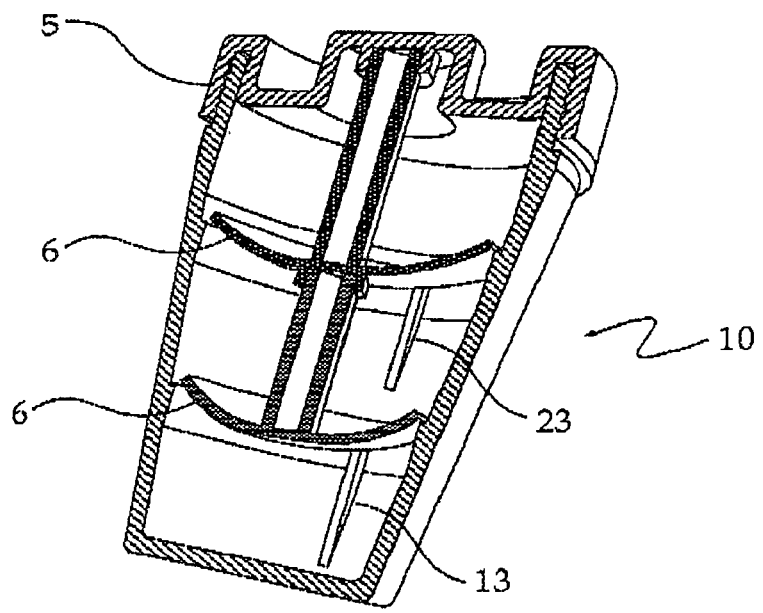
Figure 9:
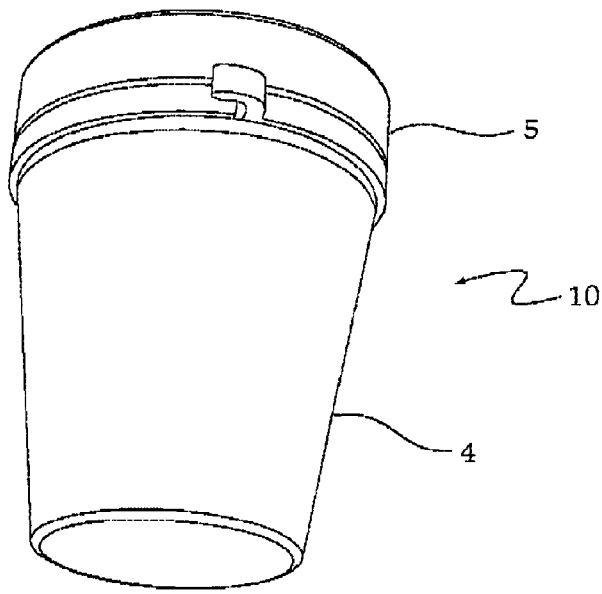
Figures 10A, 10B:
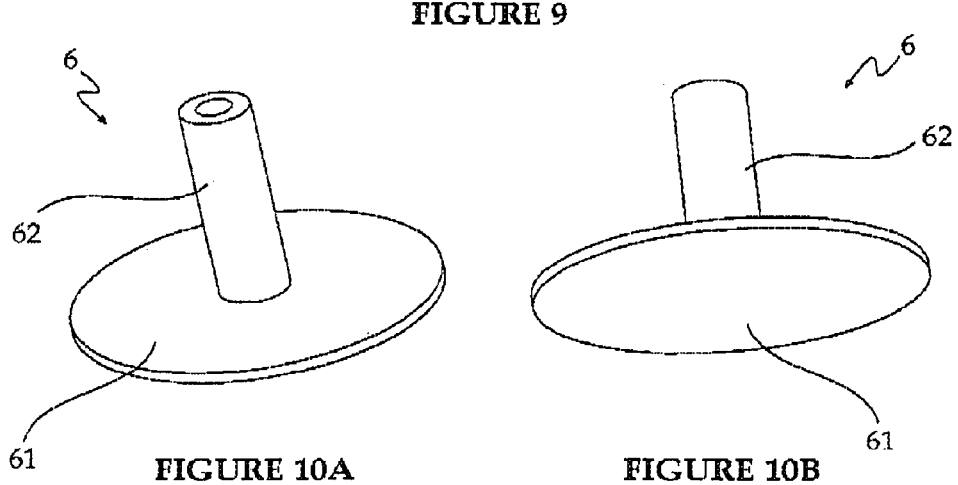
Figure 11:
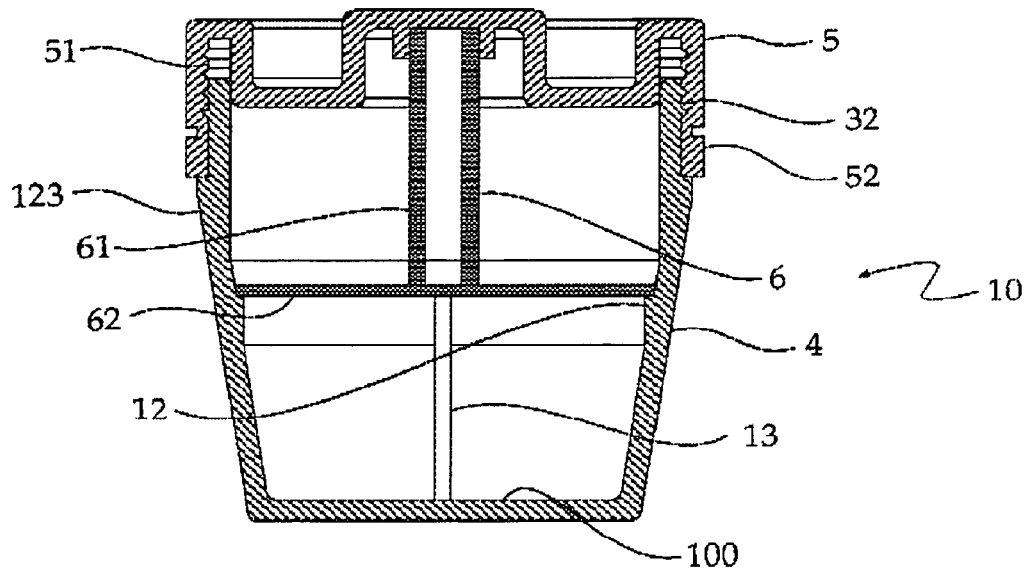
Figure 12:
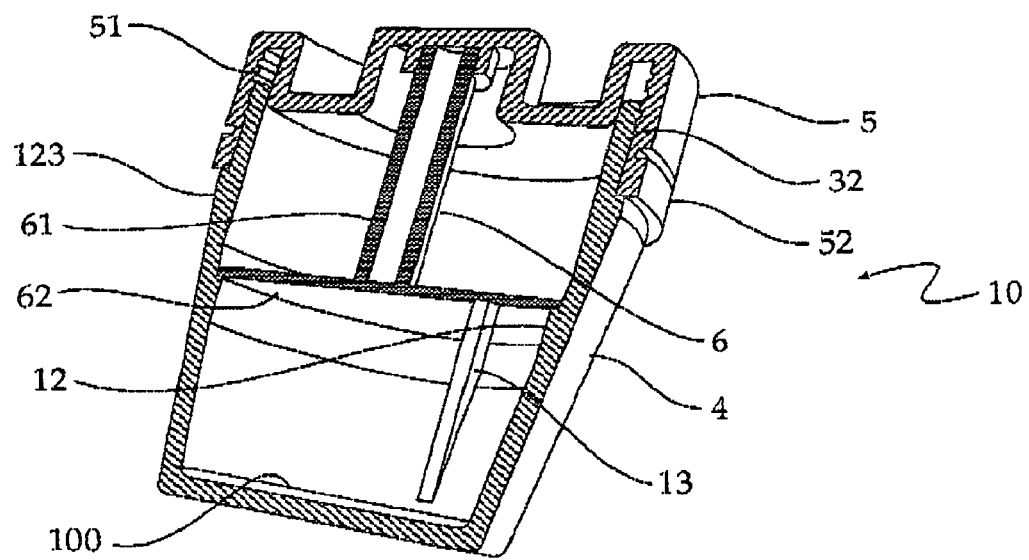

The present invention refers to a mixing tumbler with two or more compartments, each of which contains a different component of the mixture in liquid, powder or other appropriate form, such that immediately prior to use, the user may cause the components from the different compartments to mix together and create the desired mixture.

BACKGROUND ART

There are many instances in which several known components, which are in liquid, powder or other form, must be mixed together to create a desired mixture immediately prior to its use. Such a need exists in a wide variety of areas and situations, such as in the mixing of drinks immediately prior to the consumption of the mixture, for instance alcoholic beverages or energy drinks, mixing of liquids and powders to create pastes used in dentistry, mixing of liquids and/or other substances for medical uses, mixing of two or more components to create adhesive mixtures, and so on and so forth.

In order to create the desired mixture, the user must have on hand several containers with the individual components needed to create the mixture. When the time comes to create the mixture, the user must open each of the individual containers containing the components, pour a measured quantity of each component into an additional container, and mix them together to obtain the desire mixture. In an attempt to streamline the preparation of such desired mixtures, and to abolish the need to store, to measure, to pour and to mix the multiple individual components, the inventor has invented a mixing tumbler that solves the aforementioned problems.

THE DRAWINGS

The drawings attached to the present application are not intended to limit the scope of the invention and the possible ways of its application. The drawings are intended only to illustrate the invention and constitute only one of many possible ways of its application.

Drawings Nos. 1 and 2 present cross-sections of the flask (4) that comprises three compartments (1) (2) (3) with collapse ribs (13) (23).

Drawings Nos. 3-5 present cross-sections of the mixing tumbler (10) comprising a flask (4), which is divided into three compartments (1) (2) (3), two separation discs (6), and a cover (5).

Drawing No. 6 presents an overview of the flask (4).

Drawings Nos. 7 and 8 present cross-sections of the mixing tumbler (10) with the cover (5) closed and in compressed mode.

Drawing No. 9 presents the mixing tumbler (10) in perspective.

Drawings No. 10A and 10B depict a separation disc (6) that comprises a flat disc (61) and a compression shaft (62).

Drawings Nos. 11-12 present cross-sections of the mixing tumbler (10) comprising two compartments.

THE INVENTION

The main objective of the present invention is to provide a mixing tumbler (10) with two or more compartments, each of which contains a pre-defined quantity of a certain component. The components in the compartments are intended for the preparation of a desired mixture that should, and sometimes must, be prepared immediately prior to use. The mixing tumbler is structured so that the user can actively cause the partitions between the compartments to collapse, enabling the components to mix and create the desired mixture. Another objective of the present invention is to provide a mixing tumbler (10), as described above, that is inexpensive and easy to manufacture.

The mixing tumbler (10), subject of the present invention, comprises a flask (4) that is divided into several compartments, a cover (5), and one or more separation discs (6). The following explanation will refer to a mixing tumbler (10) with three compartments: a bottom compartment (1), a middle compartment (2), and a top compartment (3), although the present invention and patent application apply to a mixing tumbler (10) with any number of compartments, two or more.

The flask (4) is manufactured as one piece but for the sake of simplicity, each of its parts will be described separately. The flask (4) may be manufactured from a variety of materials, such as glass, plastic or any material commonly used to manufacture flasks. The bottom compartment (1) of the flask (4) comprises a circumferential wall (11) and a bottom (100) such that it is shaped like a container that is closed on all sides and open at the top. The rim of the circumferential wall (11) ends with a circumferential horizontal ring (12). The middle compartment (2) comprises a closed circumferential wall (21) such that it is shaped like a cylinder that is open at both bottom and top. The rim of the circumferential wall (21) also ends in a circumferential horizontal ring (22). The top compartment (3) comprises a closed circumferential wall (31) such that it too is shaped like a cylinder that is open at both bottom and top. The upper, exterior of the circumferential wall (31) has an external thread (32) on it whose function will be explained later on in the application.

The bottom compartment (1) and the middle compartment (2) each have one or more collapse ribs (13) (23) respectively. A collapse rib is a vertical protrusion that runs from the upper edge of the circumferential wall (11) (21) to its bottom. In general, the collapse ribs (13) (23) may not reach the bottom of the relevant compartment, although this is recommended since it facilitates manufacturing. It is also recommended that each compartment have three collapse ribs and that they be distributed evenly around the circumference of the compartment.

The cover (5) has the general shape of a standard cover and its circumference matches that of the top compartment's circumferential wall (31). The cover (5) comprises a fitted, circumferential rim with an internal thread (51) that corresponds to the external thread (32) on the top compartment (3). When the mixing tumbler (10) is in closed position, the internal thread (51) is only partially screwed onto the external thread (32) of the top compartment. The cover (5) has a safety and opening ring (52), which is similar to safety rings commonly found on standard covers. The cover (5) may be made of a variety of to materials, although it is recommended that it be manufactured from rigid plastic, like other standard covers.

The separation disc (6) comprises a flat, thin disc (61) and a vertical compression shaft (62), which can and should be manufactured as one piece. The shape of the flat disc (61) corresponds to the shape of the inner circumference of the compartment it is intended for. The compression shaft (62) protrudes from the center of the flat disc (61) and its height corresponds to the height of the relevant compartment, as will be explained later on in the application. It is recommended that the disc (6) be made of a soft plastic (such as polyethylene, polypropylene, etc.) so that it is distorted when the mixing tumbler (10) is used, as will be explained later on in the application.

Initial preparation of the mixing tumbler (10): First, the bottom compartment (1) is filled with one component. Next, a separation disc (6) is placed in the flask (4) such that it rests on the circumferential ring (12) at the top of the bottom compartment (1) and effectively seals off the bottom compartment. The middle compartment (2) is now filled with a second component and another separation disc (6) is placed, sealing off the middle compartment (2). If the mixing tumbler (10) has more than two compartments, these operations are repeated until all compartments are filled according to need. Finally, the cover (5) is screwed on and the mixing tumbler (10) is sealed. It is important to note that the height of the compression shafts (62) corresponds to the height of the relevant compartments so that after the initial preparation of the mixing tumbler (10), as described above, the compression shaft (62) on each of the separation discs (61) touches and is slightly compressed by the bottom of the separation disc (61) above it.

Using the mixing tumbler (10) and preparing the mixture: First, the safety ring (52) is removed and the cover (5) is screwed on tighter, pushing the compression shafts (62) and causing the flat separation discs (61) to collapse and distort. Since the discs are pressed downward and are distorted against the collapse ribs (13) (23), and gaps are created between the compartments that enable the components in the compartments to mix. Shaking the tumbler (10) can expedite mixing and increase efficiency. The cover (5) is now removed and the mixture is ready for use.

As mentioned above, the mixing tumbler (10) can have two or more compartments. For illustration purposes, Drawings Nos. 11 and 12 depict a mixing tumbler (10) with only two compartments. For the sake of clarity and simplicity of the explanation, we will refer hereinafter to a mixing tumbler (10) with only two compartments, although everything specified refers in fact to mixing tumblers (10) with any number of compartments. The structure of the mixing tumbler (10) can be summarized, based on the above descriptions and on the drawings attached to the application, as follows:

A mixing tumbler (10) that comprises a flask (4), a separation disc (6), and a cover (5).

Whereby the flask (4) is a closed container with an opening on top, which comprises a closed circumferential side (123), a bottom (100), a circumferential horizontal ring (12), and one or more collapse ribs (13).

The closed circumferential side (123), depicted in Drawings Nos. 11 and 12, is in fact made up of the closed circumferential walls (11), (21) and (31), depicted in Drawings Nos. 1-5 and 7-8.

Whereby the upper, exterior end of the closed circumferential side (123) has an external thread (32) on it.

Whereby the circumferential horizontal ring (12) protrudes from the inner part of the closed circumferential side (123).

Whereby the collapse rib (13) is in fact a protrusion from the edge of the said circumferential horizontal ring (12).

Whereby the cover (5) has an internal thread (51) that corresponds to the said external thread (32)

Whereby the separation disc (6) comprises a flat disc (61) and a vertical compression shaft (62). Whereby the diameter of the flat disc (61) corresponds to the diameter of the circumferential horizontal ring (12). Whereby the length of the vertical compression shaft (62) corresponds to the distance between the circumferential horizontal ring (12) and the cover (5). Whereby the separation disc (6) is designed to be placed on the circumferential horizontal ring (12) and the vertical compression shaft (62) faces upward and touches the cover (5) when in closed position.

What is claimed is:

1. A mixing tumbler comprising: a flask, at least one separation disc and a cover for closing an opening of said flask; wherein said flask is a container with the opening located at a top of said container, said flask comprises a closed circumferential side, a closed bottom, at least one circumferential horizontal ring, and at least one vertical collapse rib; wherein said at least one circumferential horizontal ring protrudes from an inner part of said closed circumferential side; wherein said at least one vertical collapse rib has a top end and a bottom end and protrudes from an inner side of said closed circumferential side; wherein said top end of at said least one vertical collapse rib is located proximate said at least one circumferential horizontal ring and the rib extends vertically downwardly to the bottom end thereof; wherein an upper exterior end of said closed circumferential side proximate said opening has an external thread thereon; wherein the cover has an internal thread that engages said external thread to close the container; wherein the at least one separation disc comprises a flexible flat disc and a vertical compression shaft attached to said disc; wherein the diameter of said flexible flat disc substantially equals a diameter of said at least one circumferential horizontal ring; wherein the length of the vertical compression shaft substantially equals the distance between said at least one circumferential horizontal ring and the cover; wherein said at least one separation disc contacts an upper surface of said at least one circumferential horizontal ring and the vertical compression shaft extends upward and touches the cover when in the closed position.

2. The mixing tumbler of claim 1, wherein said at least one vertical collapse rib comprises three vertical collapse ribs generally equally spaced about the inner side of said closed circumferential side.

3. The mixing tumbler of claim 1, wherein said at least one separation disc comprises a plurality of said flexible flat discs and said at least one circumferential horizontal ring comprises a plurality of said rings thereby forming multiple compartments in said flask.

* * * * *